(12) United States Patent
Matsubayashi et al.

(10) Patent No.: US 7,946,481 B2
(45) Date of Patent: May 24, 2011

(54) SYSTEM FOR REGISTERING AND USING ADMINISTRATIVE CARDS TO ENABLE CONFIGURATION OF AN APPLICATION AND DEVICE

(75) Inventors: Don H. Matsubayashi, Tustin, CA (US); Craig Mazzagatte, Aliso Viejo, CA (US); Neil Y. Iwamoto, Mission Viejo, CA (US); Royce E. Slick, Mission Viejo, CA (US); Dariusz Dusberger, Irvine, CA (US); Kevin F. Piazza, Santa Ana, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 11/457,748

(22) Filed: Jul. 14, 2006

(65) Prior Publication Data

US 2008/0011826 A1    Jan. 17, 2008

(51) Int. Cl.
*G06K 5/00* (2006.01)
(52) U.S. Cl. .................. 235/380; 235/492; 235/487
(58) Field of Classification Search .............. 235/380, 235/492, 451, 487, 382
See application file for complete search history.

(56) References Cited

U.S. PATENT DOCUMENTS

| | | | |
|---|---|---|---|
| H1794 H * | 4/1999 | Claus | 235/380 |
| 6,382,506 B1 * | 5/2002 | Van Der Valk | 235/380 |
| 6,481,632 B2 * | 11/2002 | Wentker et al. | 235/492 |
| 6,834,795 B1 * | 12/2004 | Rasmussen et al. | 235/380 |
| 7,016,854 B2 * | 3/2006 | Himes | 705/14 |
| 7,496,193 B2 * | 2/2009 | Nachef et al. | 379/357.01 |
| 2003/0105969 A1 * | 6/2003 | Matsui et al. | 713/194 |
| 2004/0172552 A1 * | 9/2004 | Boyles et al. | 713/200 |
| 2006/0043164 A1 * | 3/2006 | Dowling et al. | 235/375 |
| 2006/0118619 A1 * | 6/2006 | Hulst et al. | 235/380 |
| 2006/0157553 A1 * | 7/2006 | Kelley et al. | 235/380 |
| 2008/0017698 A1 * | 1/2008 | Wetherill et al. | 235/375 |

* cited by examiner

*Primary Examiner* — Edwyn Labaze
(74) *Attorney, Agent, or Firm* — Canon U.S.A., Inc., IP Division

(57) ABSTRACT

A method and system for registering a card that is used to enable configurations of an application and/or a device. The method and system includes initializing into an administrative card setup mode, providing information for at least one card to be registered, storing the information for the at least one card to be registered, and exiting the administrative card setup mode.

15 Claims, 4 Drawing Sheets

SYSTEM FOR REGISTERING AND USING ADMINISTRATIVE CARDS TO ENABLE CONFIGURATION OF AN APPLICATION AND DEVICE

BACKGROUND OF THE INVENTION

1. Field of the Invention

The present invention relates to a system and method for registering a card where the card is used for administrative purposes. More particularly, registering a card that is used to enable configurations of an application and/or a device.

2. Description of the Related Art

One requirement currently associated with peripheral devices, e.g., multifunction machine, is that the peripheral device needs to provide a way for users to configure applications on the device, as well as the device itself. Typically, the ability to perform a configuration operation should not be available to all users of the peripheral device, but rather a limited set of users, e.g., network administrator.

One approach currently implemented to restrict access to a configuration operation is to only allow a one-time configuration operation of the application, such as during its initial setup. Since the configuration can only be changed/modified at one time, in order to perform another configuration operation, the corresponding configuration application must be uninstalled from the peripheral device and then reinstalled. This is extremely user unfriendly as it is a cumbersome and time consuming operation.

Another approach to restricting access to a configuration operation is to provide a password protected, special administrator mode, where an input of passwords are required to access configuration screen(s). The passwords are hard-coded into the configuration application. If the passwords are compromised, the entire configuration application is compromised, thus requiring installation of a new configuration application.

Still yet another approach to restricting access to a configuration operation is to provide a special access card that if presented to the peripheral device, e.g., swiping the card through a card reader connected to the peripheral device, provides a configuration screen. This approach is more secure than the previously described approaches since the person seeking access must be in possession of the special access card. However, special access cards need to be created for each peripheral device and the number of cards for a particular peripheral device is usually limited for security purposes.

All of the above described approaches are viable methods to restrict access to a configuration operation. However, what is needed is a more flexible solution that can overcome the shortcomings of the aforementioned solutions.

SUMMARY OF THE INVENTION

The forgoing problems are addressed by a method and system for registering a card that is used to enable configuration of an application supported on a device, as well as the device itself. The present invention utilizes a system that does not have the limitations described above, while providing a high level of security and maintainability.

In one aspect, a method for registering a card enabling configuration of an application and/or device comprises initializing into an administrative card setup mode, providing information for at least one card to be registered, storing the information for the at least one card to be registered, and exiting the administrative card setup mode.

In another aspect, administrative cards are assigned to multiple peripheral devices. Administrative card information is transferred to a server, where the server informs the peripheral device whether a particular administrative card currently being used is associated with that particular peripheral device.

Further features of the present invention will become apparent from the following description of exemplary embodiments (with reference to the attached drawings).

DETAILED DESCRIPTION OF THE INVENTION

The invention is described by way of an exemplary embodiments, and it is understood that the description is not intended to limit the invention to these embodiment, but is intended to cover alternatives, equivalents, and modifications such as are included within the scope of the appended claims.

Figure 1:
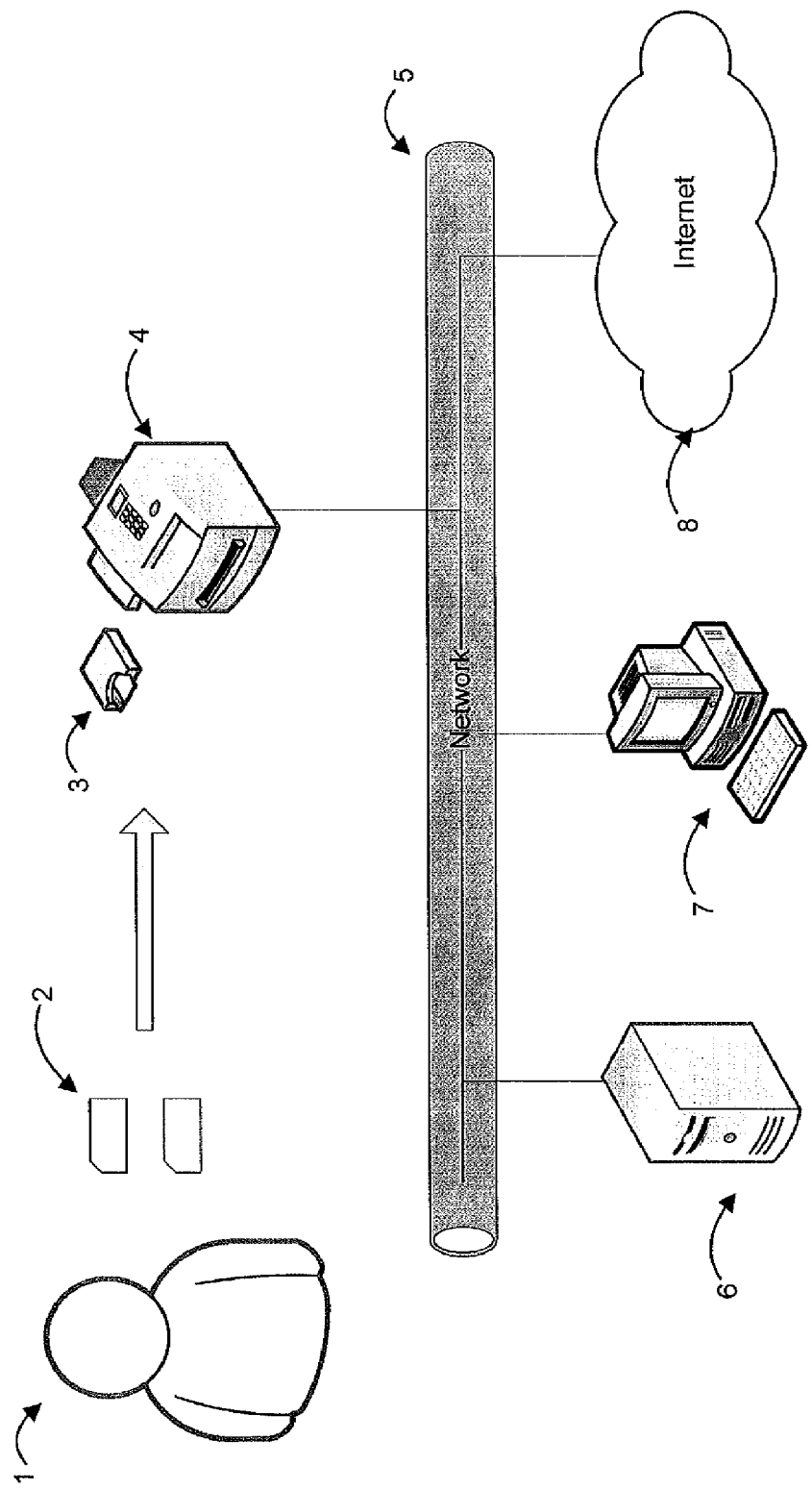
FIG. 1 is a representational view of the general configuration of the system.

FIG. 1 is a representational view of the general configuration of the system for registering and using administrative cards to enable configuration of an application and peripheral device. An administrator 1 is in possession of one or more administrative cards 2. In the present embodiment, the administrative card(s) 2 are cards that contain user identification information, such as a credit card or a driver's license. The type of card used as an administrative card is not limited to these types of cards, and any card that would enable practice of the present invention is applicable. Card reader 3 is able to read information stored on administrative cards 2. Peripheral device 4 is connected to the card reader 3 by any type of connection means, such as USB IEEE1394, 802.11(g) wireless, etc., that would enable practice of the present invention. In the present embodiment, peripheral device 4 is a multi-function peripheral device (MFP). However, any device that would enable practice of the present invention is applicable. Network 5 connects peripheral device 4 to the Internet 8, as well as to personal computer 7 and server 6. Network 5 can be any type of network, such as a local area network (LAN), wide area network (WAN, and can either be a wired or wireless network, or a combination of the two.

Figure 2:
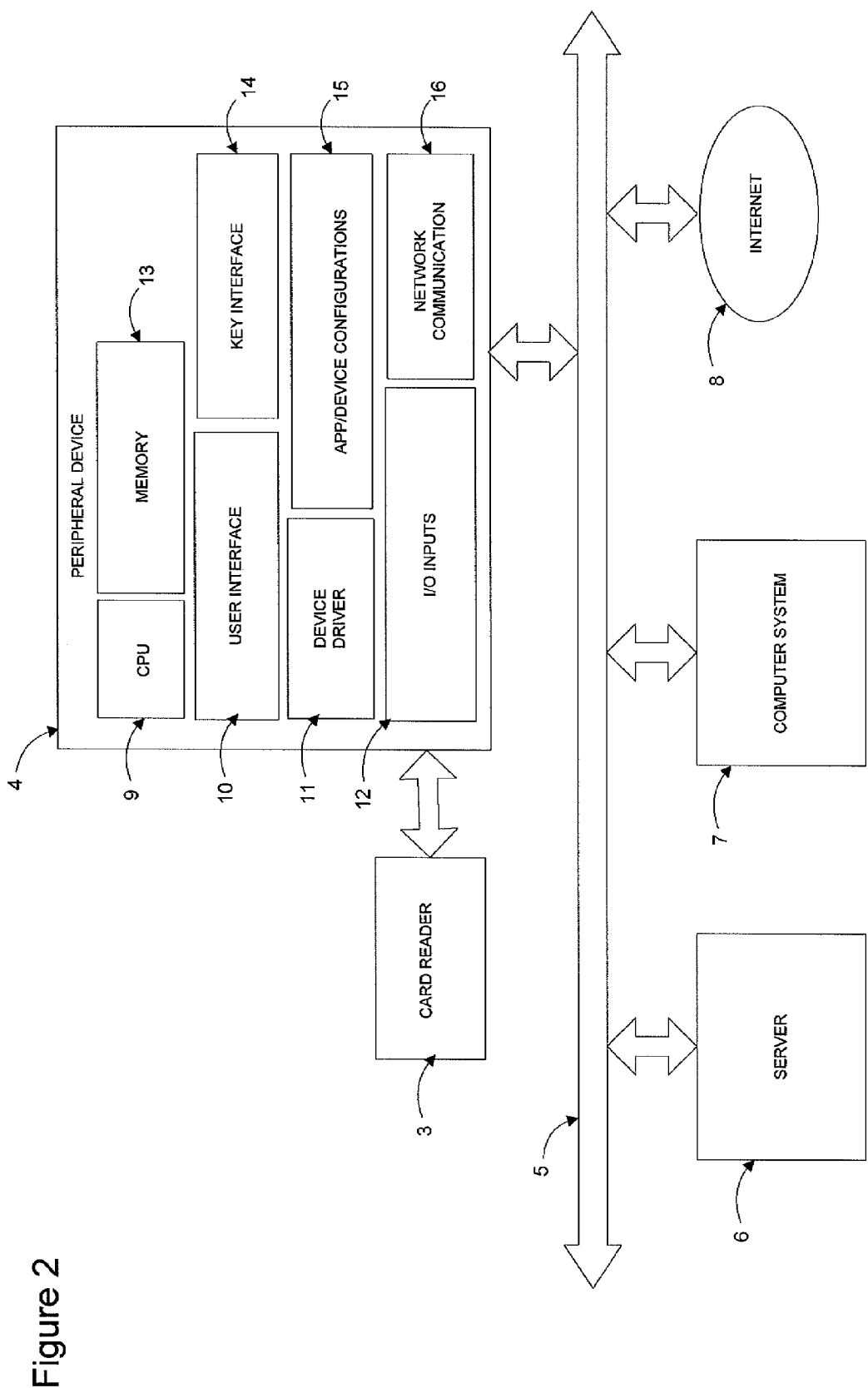
FIG. 2 is a representational view of the configuration of the peripheral device of the present invention.

FIG. 2 is a representational view of the configuration of the peripheral device of the present invention. Peripheral device 4 comprises a central processing unit (CPU) 9, a display or graphical user interface 10, device driver 11, I/O inputs 12 for connecting the peripheral device 4 with the card reader 3 through a communication interface such as a USB interface, memory 13, a key interface 14 for typing numbers or letters, application and device configurations 15, and network communication 16 for connecting the peripheral device 4 with network 5. The other components depicted in FIG. 2 are as described above with respect to FIG. 1.

Figure 3:
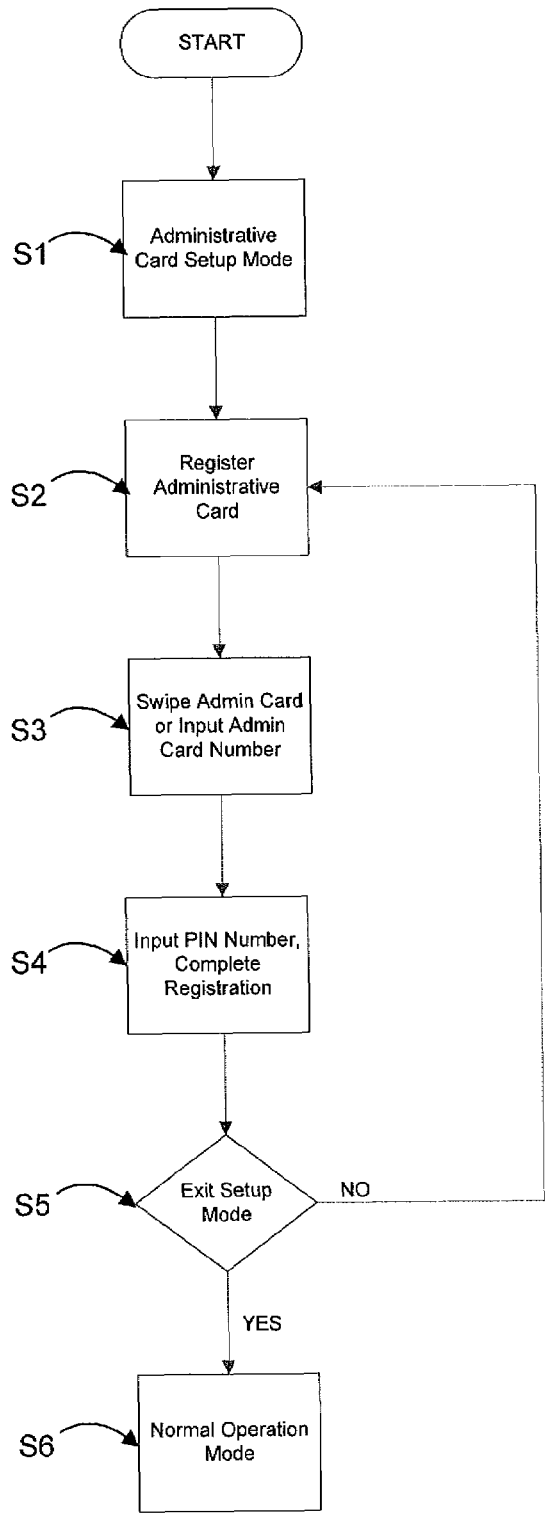
FIG. 3 is a flowchart describing an exemplary embodiment of registering an administrative card of the present invention.

FIG. 3 is a flowchart describing an exemplary embodiment of registering an administrative card of the present invention. Briefly, the steps include registering administrative cards and using them to enable configuration of an application and device.

In more detail, in step S1, the peripheral device 4 is shipped/delivered in an Administrative Card Setup Mode. In step S2, upon power up of the peripheral device 4, an administrator is prompted by the application of the peripheral device 4 to register an administrative card 2. Next in step S3, the administrator presents the administrative card 2, e.g., inserts it into the card reader 3, to the peripheral device 4. Alternatively, the card number can be entered via the peripheral device's user interface 10. The hash of the card number is stored securely in the persistent memory 13 of the peripheral device 4. In step S4, for each administrative card 2 being registered, the administrator is optionally prompted to input a PIN number associated with the card. The hash of the PIN number is stored securely in the persistent memory 13 of the peripheral device 4.

After the administrative card 2 is registered, flow proceeds to step S5, where the administrator is prompted to either exit the Administrative Card Setup Mode or register additional administrative cards 2. If the administrator chooses to register additional administrative cards 2, the process returns to step S2 and steps S3 and S4 are repeated for each additional administrative card 2. If the administrator chooses not to register any more administrative cards 2, the Administrative Card Setup Mode is exited, and in step S6, Normal Operation Mode is entered. Peripheral device's 4 standard functionality, i.e., printing, scanning, copying, etc., are available in Normal Operation Mode.

Figure 4:
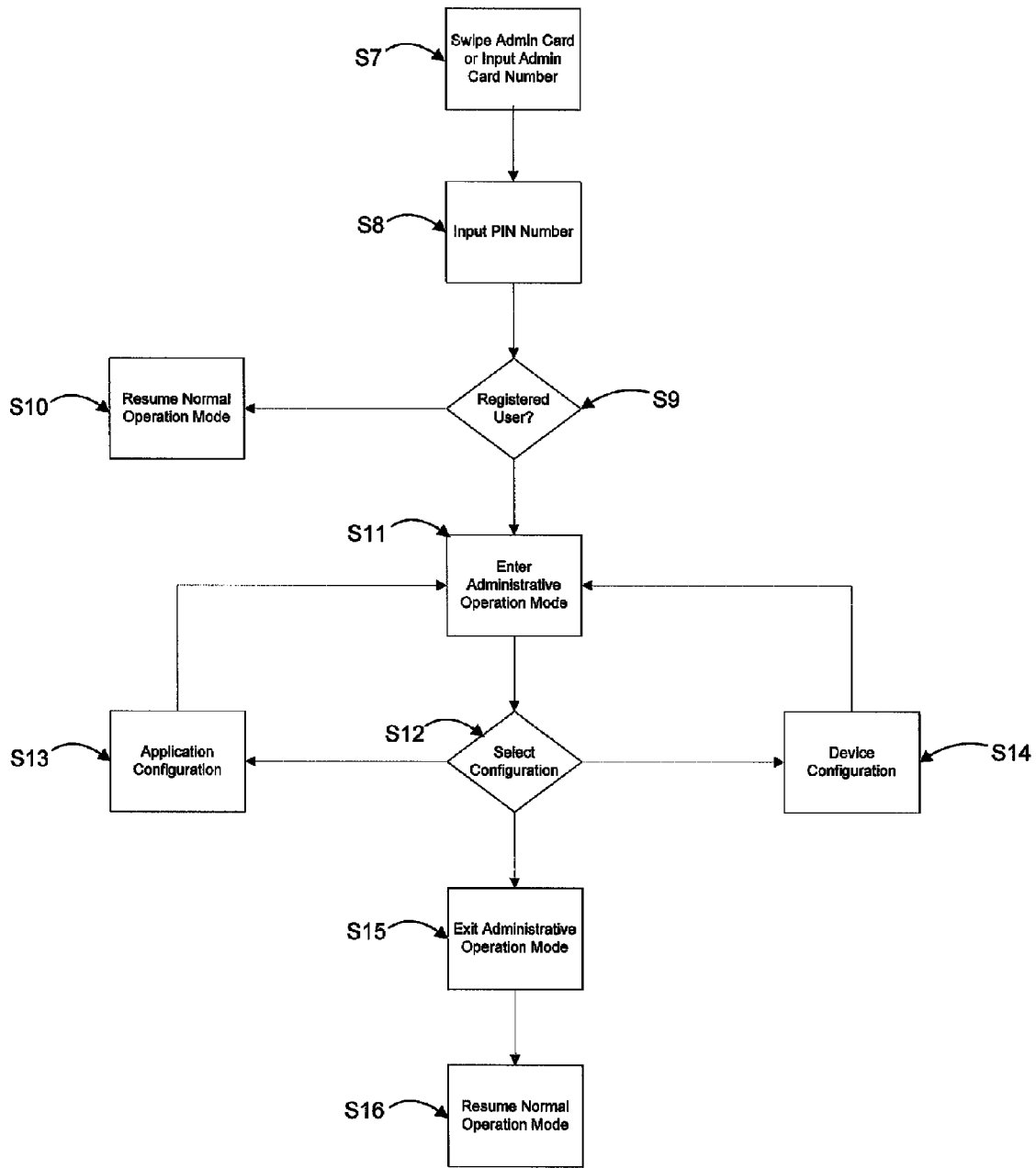
FIG. 4 is a flowchart describing an exemplary embodiment of entering the administrative operational mode.

FIG. 4 is a flowchart describing an exemplary embodiment of entering the administrative operational mode. In more detail, in step S7, the administrator presents the administrative card 2 at the peripheral device 4 or alternatively, inputs the card number using the peripheral device's user interface 10. The peripheral device 4 then compares the hash of the swiped administrative card 2 against the list of card hashes previously registered as described above in FIG. 3.

If the presented administrative card 2 matches a previously registered administrative card 2, and a PIN number has been associated with the card as described above, then in step S8, the administrator is prompted to input the PIN number provided during registration of the administrative card 2 as described above with respect to FIG. 3. In step S9, the peripheral device 4 checks if the hash of the PIN number matches the registered PIN number hash. If no match occurs, flow proceeds to step S10, where the peripheral device 4 resumes/remains in Normal Operation Mode. If a match does occur, the process proceeds to step S11, where the peripheral device 4 enters an Administrative Operation Mode.

In step S12, the administrator selects the proper configuration, either an application configuration (step S13) or a device configuration (step S14). For example, the application has information of a billing server that needs to be changed, or to view/change the peripheral device's IP address, or providing an option to only print on a specific size paper etc. The list of configurations is not limited to that provided and any configuration that would enable practice of the present invention is applicable. For example, an administrative operation for refunding a previous credit card transaction. Once the configuration operation is completed, in step S15, the administrator exits the Administrative Operation Mode, and in step S16, the peripheral device 4 resumes Normal Operations Mode.

In another embodiment, in order to enter the Administrative Operation Mode, the administrator swipes the administrative card 2 in conjunction with entering a code (e.g., using keys on the peripheral device's 4 user interface). The code can be used, for example, to indicate to the peripheral device 4 that the next card swipe is an administrator since other cards may be use to trigger other actions on the peripheral device 4.

In another exemplary embodiment, administrative card 2 can be assigned to multiple peripheral devices. The administrative card 2 information registered during the Administrative Card Setup Mode is securely transmitted to a server 6. Once this is done, other applications and/or devices that are needed to recognize the registered administrative cards 2 for Administrative Operational Mode may be associated with the registered administrative cards 2. During Normal Operation Mode, if an administrator presents their administrative card 2 to a particular peripheral device, the server 6 determines if the administrative card 2 is registered with that peripheral device and informs the peripheral device if the administrator is allowed to access the Administrative Operation Mode. Optionally, the peripheral device may periodically download the card list from the server 6 and cache the information. This has the benefit of being able to respond to administrative card 2 swipes when the network is down.

While the present invention has been described with reference to exemplary embodiments, it is to be understood that the invention is not limited to the disclosed exemplary embodiments. The scope of the following claims is to be accorded to broadest interpretation so as to encompass all such modifications and equivalent structures and functions.

What is claimed is:

1. A method for registering at least one card enabling configuration of an application and/or a device, the method comprising:
    initializing into an administrative card setup mode where at least one card is able to be registered as an administrative card that enables configuration of the one or more of the application and the device;
    providing information, while in the administrative card setup mode, for the at least one card to be registered as an administrative card;
    storing the information, while in the administrative card setup mode, for the at least one card to be registered as an administrative card; and
    exiting the administrative card setup mode.

2. A method according to claim 1, wherein the information for the at least one card is provided using a card reader.

3. A method according to claim 1, wherein the information for the at least one card is provided by inputting a number associated with the at least one card.

4. A method according to claim 1, wherein a PIN number is associated with the at least one card for which information was provided.

5. A method according to claim 1, wherein the information for the at least one card is stored in a storage medium of a device.

6. A method according to claim 1, wherein the information for the at least one card is stored in a remote storage medium.

7. A method according to claim 1, wherein the information provided includes user identification information.

8. A system for registering at least one card used to enable application and device configurations, the system comprising:
    initializing into an administrative card setup mode where the at least one card is able to be registered as an administrative card, wherein an administrative card enables application and device configurations;
    providing information, while in the administrative card setup mode, for the at least one card to be registered as an administrative card;

storing the information, while in the administrative card setup mode, for the at least one card to be registered as an administrative card; and exiting the administrative card setup mode.

9. A system according to claim 8, wherein the information for the least one card is provided by using a card reader.

10. A system according to claim 8, wherein the information for the at least one card is provided by inputting a number associated with the at least one card.

11. A system according to claim 8, wherein a PIN number is associated with the at least one card for which information was provided.

12. A system according to claim 8, where the information for the at least one card is stored in a storage medium of a device.

13. A system according to claim 8, wherein the information for the at least one card is stored in a remote storage medium.

14. A system according to claim 8, wherein the information provided includes user identification information.

15. A method for registering an administrative card for one or more of an application and a peripheral device that require the use of administrative permissions to enable configuration of the one or more of the application and the peripheral device, the method comprising:

setting one or more of an application and a peripheral device into an administrative card setup mode wherein the one or more of the application and the peripheral device is able to register a card as an administrative card, and wherein an administrative card enables configuration of the one or more of an application and a peripheral device;

receiving card information at the one or more of the application and the peripheral device while in the administrative card setup mode, wherein the card information includes information identifying the card;

saving the card information for the card to be registered as an administrative card, wherein the saved card information is accessible to the one or more of the application and the peripheral device; and exiting the one or more of the application and the peripheral device from the administrative card setup mode.

* * * * *

UNITED STATES PATENT AND TRADEMARK OFFICE
CERTIFICATE OF CORRECTION

PATENT NO. : 7,946,481 B2
APPLICATION NO. : 11/457748
DATED : May 24, 2011
INVENTOR(S) : Don H. Matsubayashi et al.

It is certified that error appears in the above-identified patent and that said Letters Patent is hereby corrected as shown below:

In the Title Page, Item (73), for the Assignee, delete "Canon Kabushiki Kaisha, Tokyo (JP)" and insert therein -- Canon U.S.A., Inc., Lake Success, NY (US) --

Signed and Sealed this
Twenty-sixth Day of July, 2011

David J. Kappos
*Director of the United States Patent and Trademark Office*